United States Patent
Lin et al.

(10) Patent No.: US 6,359,501 B2
(45) Date of Patent: Mar. 19, 2002

(54) CHARGE-PUMPING CIRCUITS FOR A LOW-SUPPLY VOLTAGE

(75) Inventors: Hongchin Lin, Taichung; Kai-Hsun Chang, Taipei Hsien; Shyh-Chyi Wong, Taichung, all of (TW)

(73) Assignee: Windbond Eelctronics Corp., Hsinchu (TW)

( * ) Notice: Subject to any disclaimer, the term of this patent is extended or adjusted under 35 U.S.C. 154(b) by 0 days.

(21) Appl. No.: 09/779,876

(22) Filed: Feb. 8, 2001

(30) Foreign Application Priority Data

Feb. 11, 2000 (TW) ......................... 89102259 A

(51) Int. Cl.⁷ ............................................. G05F 1/10
(52) U.S. Cl. ......................................... 327/536; 327/537
(58) Field of Search ................................. 327/390, 536, 327/535, 537, 534, 589

(56) References Cited

U.S. PATENT DOCUMENTS 5,982,223 A * 11/1999 Park et al. ................. 327/536
6,037,622 A *  3/2000 Lin et al. ................... 327/536

* cited by examiner

*Primary Examiner*—Jung Ho Kim
(74) *Attorney, Agent, or Firm*—Ladas & Parry

(57) ABSTRACT

The present invention relates to a charge-pumping circuit for low-supply voltage. A small charge-pumping circuit was added at the gates of the original Dickson charge-pumping circuit's each stage for bias voltage and the first transistor group was added between well and gate. The second transistor group was added between the gate and drain of original transistor. Thus, the charge-pumping circuit for low-supply voltage can supply a higher positive or negative voltage.

11 Claims, 3 Drawing Sheets

CHARGE-PUMPING CIRCUITS FOR A LOW-SUPPLY VOLTAGE

BACKGROUND OF THE INVENTION

1. Field of the Invention

The present invention relates to charge-pumping, and more particularly to charge-pumping circuits for a low-supply voltage, which can supply higher positive or negative voltage.

2. Description of the Prior Art

Because positive or negative biased voltage is applied to memory circuits, positive and negative voltage generation is essential in memory circuits. For SRAM or DRAM, it may be applied to reduce current leakage or decrease the time needed for charging and discharging the memory cells. In recent years, flash memory has become one of the major memory products. High positive or negative voltage is required for programming or erasing the flash memory cells. There has been a number of charge-pumping circuits available, but most of them are based on Dickson charge-pumping circuit, which was published in [On-Chip High-Voltage generation in NMOS integrated circuits using an improvement voltage multiplier technique] (IEEE J. of Solid State Circuit, Vol. 11, pp. 374–378, 1976) by J. F. Dickson. However, they may suffer from many drawbacks, such as high instantaneous current, high supply voltage, or high threshold voltage shift due to the effects of the body.

For a single power supply system, the amplitude vibration of the clocks and the supply voltage is the same. To design a low-supply voltage, charge-pumping circuit generating a high output voltage, several stages of charge-pumping sub-circuits have to be connected in series. FIG. 1 is an example of a four-stage positive charge-pumping circuit.

The circuit is a basic four-stage charge-pumping circuit. The charge-pumping circuit has five transistors being connected in series M1~M5; each gate is coupled to a drain and each substrate is coupled to a ground. The drain of transistor M1 receives supply voltage (Vdd), and the drain of transistor M5 supplies an output voltage (Vout). The four capacitors Cp1~Cp4 are coupled to the drains of transistors M2~M5, respectively. In addition, there is a load capacitor (CL) coupled to Vout. Moreover, the other sides of Cp1~Cp4 are interlacedly coupled to clock ($\phi$) or the inverted signal ($\bar{\phi}$). As the stages progress, the body effects become more severe near the output node Vout, and thus it is difficult for Vout to pump up to a higher positive voltage. For the P-Well process with N-Type substrate technologies, since a N-MOSFET can be isolated from others using different P-Wells, the substrate electrode of N-MOSFET can be coupled to the gate and drain electrodes. The MOS transistors become diodes. The body effect disappears, but the circuit may be damaged due to the high instantaneous current due to diode conduction. For the N-Well process with P-Type substrate technologies, P-MOSFET's can be used to build the pumping circuit employing the similar approach, but the same problem may occur.

SUMMARY OF THE INVENTION

The present invention proposes an improved charge-pumping circuit based on Dickson charge-pumping circuit. The improvement can be utilized under low-supply voltage conditions to generate high positive or negative voltage, to enhance charge transfer efficiency, to eliminate the body effects and high instantaneous current, and to resolve the problems of reverse charge-sharing.

The present invention proposes a charge-pumping circuit, and includes a plurality of first, second and third transistor groups and a secondary charge-pumping circuit for supplying low supply voltages. Herein, the source of each transistor of the first transistor group is coupled to the drain of the successive transistor so that all transistors of the first transistor group are coupled in series. The drain of the first transistor of the first transistor group is coupled to the supply voltages. The source of the last transistor of the first transistor group is coupled to the output of the pumping circuit, and the gate of the last transistor of the first transistor group is coupled to its own drain. Each transistor of the second transistor group has a corresponding transistor of the first transistor group exclusively, except the first and the last transistor of the first transistor group. The drain of each transistor of the second transistor group is coupled to its own gate, and to the gate of the corresponding transistor of the first transistor group. The source of each transistor of the second transistor group is coupled to its own p-well, and to the drain of its corresponding transistor of the first transistor group. Moreover, each transistor of the third transistor group has a corresponding transistor of the first transistor group exclusively. The p-well of each transistor of the third transistor group is coupled to its own source, and to the p-well of its corresponding transistor of the first transistor group. The drain of each transistor of the third transistor group is coupled to the source of its corresponding transistor of the first transistor group. The gate of the first transistor of the third transistor group corresponding to the first transistor of the first transistor group is coupled to the clock. Excluding the first transistor of the third transistor group, the gate of each transistor of the third transistor group is coupled to the drain of the corresponding transistor of the first transistor group. Each capacitor of a first capacitor group has a corresponding transistor of the first transistor group excluding the first transistor. The first end of each capacitor of the first capacitor group is coupled to the drain of its corresponding transistor of the first transistor group; the second end of each capacitor of the first capacitor group is interlacedly coupled to the clock or the inverted signal.

The secondary charge-pumping circuit mentioned above includes a plurality of fourth and fifth transistor groups and a second capacitor group. Therefore, the source of each transistor of the fourth transistor group is coupled to the drain of successive transistors so that all transistors of the fourth transistor group are coupled in series. The drain of the first transistor of the fourth transistor group is coupled to the supply voltage. The source of the last transistor of the fourth transistor group is coupled to the output of the pumping circuit, and the gate of the last transistor of the fourth transistor group is coupled to its drain. Each transistor of the first transistor group has a corresponding transistor of the fourth transistor group exclusively, except for the first and the second transistors of the fourth transistor group; and the gate of each transistor of the first transistor group is coupled to the corresponding gate of each transistor of the fourth transistor group. Each transistor of the fifth transistor has a corresponding transistor of the fourth transistor group. Moreover, p-well of each transistor of the fifth transistor group is coupled to its own source, and to the p-well of the corresponding transistor of the fourth transistor group. The drain of each transistor of the fifth transistor group is coupled to the source of the corresponding transistor of the fourth transistor group. The gate of the first transistor of the fifth transistor group corresponding to the first transistor of the fourth transistor group is coupled to the clock. The gates of other transistors of the fifth transistor group are coupled to the drains of the corresponding transistors of the fourth transistor group. Each capacitor of the second capacitor group has a corresponding transistor of the fourth transistor group excluding the first transistor. The first end of each capacitor of the second capacitor group is coupled to the drain of the corresponding transistor of the fourth transistor group; the second end of each capacitor of the second capacitor group is interlacedly coupled to the clock or the inverted signal.

The present invention eliminates the body effect due to the third transistor group added, and eliminates the reverse charge-sharing problems due to the second transistor group added. Thus, charge-pumping circuit of the present invention resolves the problems generated by traditional Dickson pumping circuit.

These and further features, aspects and advantages of the present invention, as well as the structure and operation of various embodiments thereof, will become readily apparent with reference to the following detailed description of a presently preferred, but nonetheless illustrative embodiment when read in conjunction with the accompanying drawings, in which like reference numbers indicate identical or functionally similar elements throughout the enumerated Figures.

BRIEF DESCRIPTION OF THE DRAWINGS

The present invention will become more fully understood from the detailed description given herein below and the accompanying drawings, given by way of illustration only and thus not intended to be limitative of the present invention.

DETAILED DESCRIPTION OF THE INVENTION

Reference is now made in detail to an embodiment of the present invention that illustrates the best mode presently contemplated by the inventor(s) for practicing the present invention. Other embodiments are also described herein.

Figure 2:
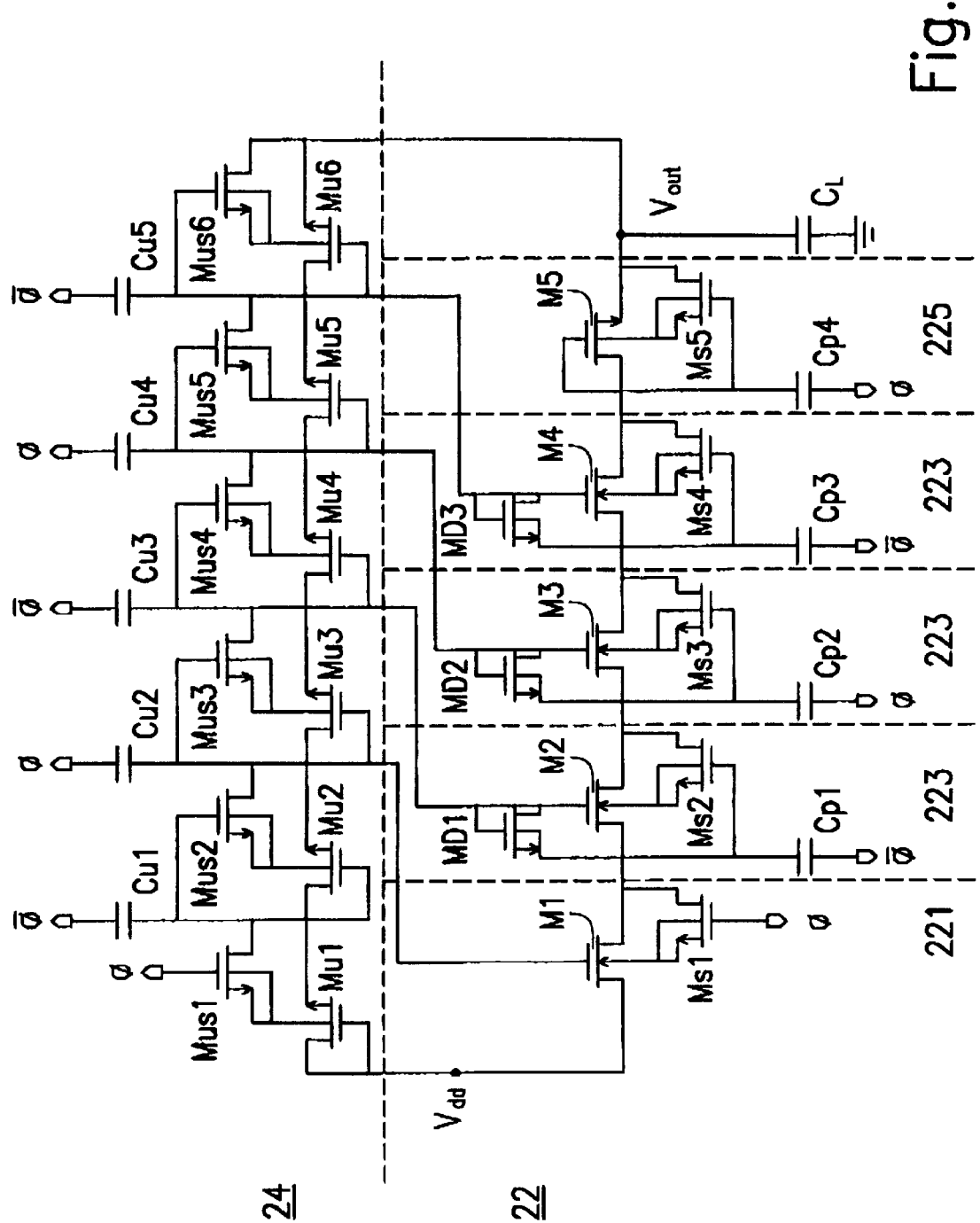
FIG. 2 shows the four-stage positive charge-pumping circuit overcoming the effects of the body with gates controlled by a secondary pumping circuit, while utilizes the "gate-drain bias" transistors.

The new-four stage positive charge-pumping circuit 22 using N-MOSFET is shown in FIG. 2. The circuit can be divided into two parts: the primary pumping circuit 22, under the dash line, and the secondary pumping circuit 24, above the dash line. The primary pumping circuit 22 includes a first pumping circuit unit 221, a last pumping circuit unit 225 and three intermediate pumping circuit units 223. The first pumping circuit unit 221 includes two transistors, M1 and M2. The last pumping circuit unit 225 includes two transistors, M5 and Ms5, and a capacitor, Cp4. Each intermediate pumping circuit units 223 includes transistors M2~M4, transistors Ms2~Ms4 and capacitors Cp1~Cp3, respectively. Every unit 221, 223 or 225, is isolated from the other by putting transistors M1 and MS1 in the same P-well, M2 and MS2 in another p-well. Transistors M3 and MS3, M4 and MS4, M5 and MS5 are put in different p-wells in a similar manner. In addition, MD1, MD2 and MD3 are also in three different p-wells. However, all the p-wells are in the same deep n-well. Transistors M1~M5 of a first transistor group are connected in series in a way that the sources of the transistors are coupled to the drains of their successive transistors. The drain of the first transistor M1 is coupled to power supply Vdd, and the source of the last transistor M5 is coupled to the output of the pumping circuit in order to supply output voltage Vout, and the gate of transistor M5 is coupled to its drain. The gates of transistors M2~M4 are coupled to their drains through transistors MD1 to MD3 of a second transistor group, respectively. The p-wells of transistors Ms1 to Ms5 of a third transistor group are coupled to their respective sources, as well as to the p-wells of transistors M1~M5, respectively. The drains of transistors Ms1~Ms5 are coupled to the sources of transistors M1~M5, respectively. The gates of transistors Ms2 to Ms5 are coupled to the drains of transistors M2 to M5, respectively. The gate of transistors Ms1 is directly coupled to the clock $\phi$. The drains of transistors M2 to M5 are coupled to the clock $\phi$ or the inverted signal $\bar{\phi}$ through capacitors Cp1~Cp4 of a first capacitor group, respectively. Wherein the clock $\phi$ is interlaced with the inverted signal $\bar{\phi}$. $C_L$ is the loading capacitance.

The gates of transistors M1~M4 are controlled by the secondary pumping circuit 24 above the dash line as shown in FIG. 2. In the secondary pumping circuit 24, transistors Mu1 to Mu6 of a fourth transistor group are connected in series in a way that the sources of the transistors are coupled to the drains of their successive transistors. The drain of transistor Mu1 is coupled to its gate, as well as to power supply Vdd. The source of transistor Mu6 is coupled to the output of the pumping circuit. The gates of transistors Mu1~Mu6 are coupled to their respective drains. The p-wells of transistors Mus1~Mus6 of a fifth transistor group are coupled to their respective sources, as well as to the p-wells of transistors M1~M5, respectively. The drains of transistors Mus1 to Mus6 are coupled to the sources of transistors Mu1 to Mu6, respectively. The gates of transistors Mus2 to Mus6 are coupled to the drains of transistors Mu2 to Mu6, respectively. The gate of transistor Mus1 is directly coupled to the clock $\phi$. The drains of transistors Mu2 to Mu6 are coupled to the clock $\phi$ or the inverted signal $\bar{\phi}$ through capacitors Cu1 to Cu5 of a second capacitor group, respectively. Wherein the clock $\phi$ is interlaced with the inverted signal $\bar{\phi}$.

Furthermore, the number of transistors (Mu1–Mu6) in the fourth transistor group and the number of transistors (Mus1–Mus6) in the fifth transistor group are adjustable for the best performance.

The new-four stage charge-pumping circuit using N-MOSFET based on p- or triple-well technology is shown in FIG. 2. It is assumed that the channel lengths for all transistors are the same. The channel widths of transistors M1~M5 and the capacitance of capacitors Cp1~Cp4 have to be wide and large enough to be able to drive the loading capacitance CL. In the preferred embodiment, it is assumed that the widths of M1~M5 are 100 $\mu$m, Cp1~Cp4 are 10 pF, while CL=20 pF. The clocks $\phi$ and the inverted signal $\bar{\phi}$ are used to control charging or discharging of capacitors Cp1~Cp4. Transistors Ms1~Ms5 are very small transistors with narrow channel widths, such as 2 $\mu$m. The purpose of the configuration is to make the source and the substrate of each transistor (M1 to M5) have the same potential when transistors M1~M5 are conducting the current. The widths of the gates of transistors Mu1~Mu5 and Mus1~Mus5 could be very narrow, so that the chip occupies a very small area. In the preferred embodiment, it is assumed that the widths of transistors Mu1~Mu5 are 5 μm, and those of transistors Mus1 to Mus5 are 2 μm. The capacitance of capacitors Cu1~Cu5 are also very small, such as 0.5 pF. The widths of transistors MD1~MD3 could be very small to conserve the chip area, such as 2 μm. The auxiliary technique is used here to overcome the reverse charge-sharing problem when the output node has load current.

Figure 1:
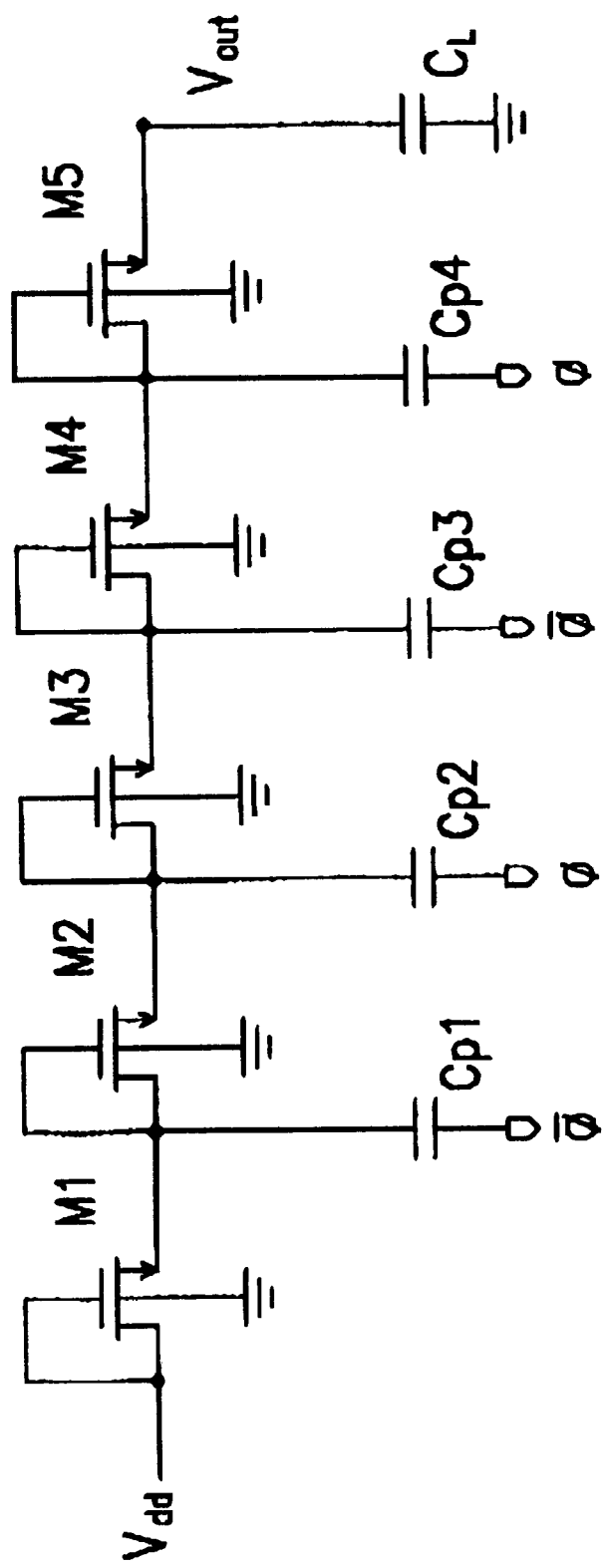
FIG. 1 shows a four-stage charge-pumping circuit.

The operation of the secondary pumping circuit 24 is similar to that of the Dickson pumping circuit shown in FIG. 1. When φ=Vdd and $\bar{\phi}$=0, Mu1, Mu3, and Mu5 are switched on. Capacitors Cu1, Cu3 and Cu5 are charged, while transistors Mu2 and Mu4 are switched off. In the mean time, transistors Mus1, Mus3 and Mus5 are switched on, so that the potential at both the source and the p-well of each transistor Mus1, Mus3 and Mus5 is the same. As a result, the body effect is eliminated. Similarly, when φ=0 and $\bar{\phi}$=Vdd, transistors Mu2 and Mu4 are switched on, capacitors Cu2 and Cu4 are charged, and transistors Mus2 and Mus4 are switched on to allow the potential at the p-well and the drain of transistors Mu2 and Mu4 to be the same, thereby eliminating the effects of the the body, while Mu1, Mu3 and Mu5 are off. In other words, When φ=Vdd, transistor Mu1 is on while transistor Mu2 is switched off which allows capacitor Cu1 to be charged. When φ=0, Mu2 is activated, and Mu1 and Mu3 are switched off, the charge stored in capacitor Cu1 is transferred to capacitor Cu2. As the procedure is repeated, the charge will be propagated to Cu5. Eventually, the voltage drop between the two ends of capacitor Cu5 will be very high. It is noticed that the gates of transistor Mu2 and Mus2 are coupled so that the potential at the gates of transistors Mu2 and Mus2 is the same. Thus transistor Mus2 is able to be turned on despite that the drain potential of transistor Mus3 is decreased. Similar explanation is applied to the pairs of transistors Mu3 and Mus3, Mu4 and Mus4, Mu5 and Mus5.

The operation of the primary pumping circuit 22 is similar to that of the secondary pumping circuit 24 described above. However, the driving power of primary pumping circuit 22 is much higher due to bigger transistors M1~M5 and capacitors Cp1~Cp4. In addition, the function of transistors Ms1~M25 is similar to that of transistors Mus1~Mus5, that is to eliminate the body effect. Moreover, the gates of transistors M1~M4 are coupled to the sources of transistors Mus2~Mus5, respectively. That is, when the gates of transistors M1~M4 are coupled to their drains, the gate potential is equal to the drain voltage. Since the voltage drop between the gate and the source has to be larger than threshold voltage (Vt), the voltage will be Vt less when it is propagated to the next level. In order to pump more efficiently, the gates of M1 to M4 are raised by the small pumping circuit, so the higher voltage can be propagated to the next level and the pumping gain can be enhanced.

Figure 3:
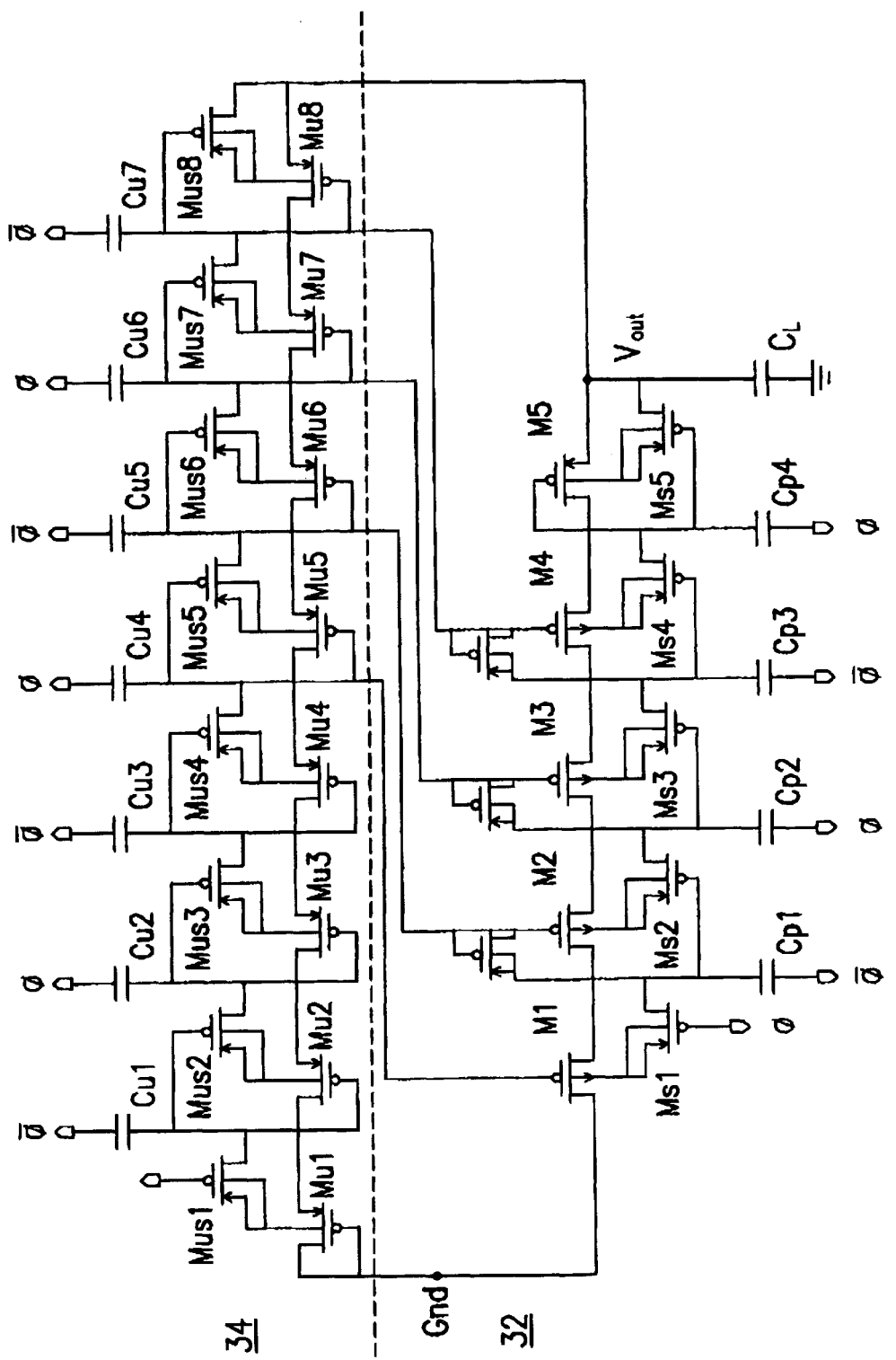
FIG. 3 shows the four-stage negative charge-pumping circuit overcoming the effects of the body with gates controlled by a secondary pumping circuit, while utilizing "gate-drain bias" transistors.

The "gate-drain bias" transistors (MD1 to MD3) are used to control the gate potential of M2 to M4. They are used to make the gate potential one threshold voltage (Vt) higher than the drain potential, since the gate potential of M2~M4 need to be small enough to be turned off. Similar ideas can be applied to negative charged pumping circuits using P-MOSFET's based on n-well/deep P-well/n-type technology. FIG. 3 shows a four-stage negative charge-pumping circuit.

The operation principles are similar to the positive pumping circuit except that the supply voltage Vdd input from the left node is replaced by the ground. As described above, the circuit comprises of two parts: the primary pumping circuit 32 and the secondary pumping circuit 34. The purpose of the small pumping circuit is to provide more negative voltage for the gates of M1 to M4. The small pumping circuit has two more stages, since |Vt| of P-MOSFET is different from that of N-MOSFET, which results in the different pumping efficiency. As described above, the "gate-drain bias" transistor technique for overcoming reverse charge-sharing is applied. The positive charge is propagated to the left of the circuit in order to store negative charges in the capacitors. For example, when φ=Vdd, the gate potential of transistor M1 drops low, and the positive charges in transistor Cp1 is transferred to the ground, while Mu2 is off. Next, when φ=0, the gate of M2 drops to low, and positive charge in Cp2 is transferred to Cp1, while Mu1 and Mu3 are off. The more positive charges are propagated to the ground, the more negative voltage is generated at Vout.

The foregoing description of the preferred embodiments of this invention has been presented for purposes of illustration and description. Obvious modifications or variations are possible in light of the above teaching. The embodiments where chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A charge-pumping circuit for low-supply voltage comprising:

a plurality of first transistors, wherein the source of each said first transistor is coupled to the drain of successive said first transistor so that all of said first translators are connected in series; wherein the drain of the first of said first transistors is coupled to a supply voltage, the source of the last of said first transistors is coupled to the output of said pumping circuit, and the gate and drain of the last of said first transistors are coupled;

a plurality of second transistors, wherein each second transistor is coupled to a corresponding said first transistor, the drain and gate of each said second transistor is coupled and connected with the gate of the corresponding said first transistor, and the source and the well of each said second transistor is coupled and connected to the drain of said corresponding first transistor;

a plurality of said third transistors, wherein each said third is coupled to one of said first transistors, the well and the source of each said third transistor is coupled and connected to the well of the corresponding said first transistor, the drain of each said third transistor is coupled to the source of the corresponding said first transistor, the gate of said third transistors corresponding to the first of said first transistors is coupled to a clock;

each gate of the transistors of said third transistor group, except for the first transistor of said third transistor group, is coupled to the drain of the corresponding transistor of said first transistor group;

a plurality of capacitors, each said capacitor has a corresponding transistor of said first transistor group exclusively, except the first transistor of said first transistor group, one ends of said capacitors are coupled to the drains of the corresponding transistors of said first transistor group, while the other ends of said capacitors are interlacedly coupled to said clock and the inverted signal of said clock; and a secondary charge-pumping circuit, which supplies bias-voltage to the gate of each transistor of said first transistor group.

2. The charge-pumping circuit as claimed in claim 1, wherein the secondary charge-pumping circuit comprising:

a plurality of fourth transistors, the source of each said fourth transistor is coupled to the drain of its successive said so that all said fourth transistors are connected in a series, the drain of the first transistor of said fourth transistors is coupled and connected to said power supply, the source of the last of said fourth transistors is coupled to the output of said pumping circuit, the gate and drain of said fourth transistors are coupled, said first transistors, excluding the last of said first transistors, have corresponding said fourth transistors, excluding the first and the second of said fourth transistors, respectively, and the gate of each said first transistor is coupled to the gate of said corresponding fourth transistors; the rule of the correspondence between said fourth transistors and said first transistors is that said clocks and said inverted signals of said second capacitors coupled to the drains of said fourth transistors are equal to said clocks and said inverted signals of said capacitors coupled to the drains of said first transistors;

a plurality of fifth transistors, wherein each said fifth has a corresponding said fourth transistors exclusively, the well and source of each said fifth transistor are coupled to the well of said corresponding fourth transistors, the drain of each said fifth transistor is coupled to the source of the corresponding fourth transistors; and the gate of the first of said fifth transistors corresponding to the first of said fourth transistors, is coupled to said clock; the gates of other said fifth transistors are coupled to the drain of said corresponding fourth transistors; and a plurality of second capacitors, wherein each said capacitor has a corresponding said fourth transistor except the first of said fourth transistors, one end of each said second capacitor is coupled to the drain of said corresponding fourth transistor, the other end of each said second capacitor is interlacedly coupled to said clock or said inverted signal.

3. The charge-pumping circuit as claimed in claim 1, wherein said transistors are NMOS transistors so that the output terminal of said charge-pumping circuit outputs a positive bias voltage.

4. The charge-pumping circuit as claimed in claim 1, wherein said transistors are PMOS transistors so that the output terminal of said charge-pumping circuit outputs negative bias voltage.

5. The charge-pumping circuit as claimed in claim 4, wherein said supply voltage is zero volts.

6. A charge-pumping circuit for low-supply voltage, comprising:

a first charge-pumping unit, comprising:

a first transistor, wherein the drain of said first transistor is coupled to a supply voltage; and a second transistor, wherein the well and source of said second transistor is coupled to the well of said first transistor, the drain of said second transistor is coupled to the source of said first transistor, and the gate of said second transistor receives a signal from clock;

a second charge-pumping unit, comprising:

a third transistor, wherein the drain and gate of said third transistor are coupled, the source of said third transistor is the output terminal of said second charge-pumping circuit;

a fourth transistor, wherein the well and source of said fourth transistor are coupled to the well of said third transistor, the drain of said fourth transistor is coupled to the source of said third transistor, and the gate of said fourth transistor is coupled to the drain of said third transistor; and a first capacitor, wherein, one end of said first capacitor is coupled to the drain of said third transistor, while the other end of said first capacitor is coupled to said clock;

at least one third charge-pumping unit, comprising:

a fifth transistor, wherein the drain of said fifth transistor is coupled to the source of said first transistor, the source of said fifth transistor is coupled to the drain of said third transistor;

a sixth transistor, wherein the well and source of said sixth transistor are coupled to the well of said fifth transistor, the drain of said sixth transistor is coupled to the source of said fifth transistor, and the gate of said sixth transistor is coupled to the drain of said fifth transistor;

a second capacitor, one end of said capacitor is coupled to the drain of said fifth transistor, the other end of said second capacitor is coupled to said inverted clock;

a seventh transistor, wherein the drain and gate of said seventh transistor are coupled to the gate of said fifth transistor, the source and substrate of said seventh transistor are coupled to the drain of said fifth transistor; and a secondary charge-pumping circuit, which supplies bias voltage to the gates of said first and said fifth transistors; and wherein said clock and said inverted signal are interlacedly coupled to said second transistor, said second capacitor and said first capacitor, respectively.

7. The charge-pumping circuit as claimed in claim 6, wherein, there are a plurality third charge-pumping circuits in which several stages of said charge-pumping circuits are connected in series.

8. The charge-pumping circuit as claimed in claim 6, wherein said transistors are NMOS transistors so that the output terminal of said charge-pumping circuit outputs a positive bias voltage.

9. The charge-pumping circuit as claimed in claim 6, wherein said transistors are PMOS transistors so that the output terminal of said charge-pumping circuit outputs a negative bias voltage.

10. The charge-pumping circuit as claimed in claim 9, wherein said supply voltage is zero volts.

11. The charge-pumping circuit as claimed in claim 6, wherein the transistors of the first charge-pumping circuit are in the same well; the transistors of the second charge-pumping circuit are in another well; the fifth and sixth transistors of the third charge-pumping circuit are in one well, but the seventh transistor is in another well; all the transistors are placed in one deep-well for triple well technology.

* * * * *

UNITED STATES PATENT AND TRADEMARK OFFICE
CERTIFICATE OF CORRECTION

PATENT NO. : 6,359,501 B2
DATED : March 19, 2002
INVENTOR(S) : Hongchin Lin et al.

It is certified that error appears in the above-identified patent and that said Letters Patent is hereby corrected as shown below:

<u>Title page,</u>
Item [73], Assignee, change "Windbond" to -- Winbond --

Signed and Sealed this

Eighteenth Day of February, 2003

JAMES E. ROGAN
*Director of the United States Patent and Trademark Office*